United States Patent [19]

Williams

[11] 3,884,312

[45] May 20, 1975

[54] ROCK CUTTER ASSEMBLIES

[75] Inventor: William C. Williams, Seattle, Wash.

[73] Assignee: The Robbins Company, Seattle, Wash.

[22] Filed: Sept. 12, 1973

[21] Appl. No.: 396,542

[52] U.S. Cl. .................. 175/372; 175/364; 308/8.2
[51] Int. Cl. .......................... F16c 35/00; E21b 9/08
[58] Field of Search ........................... 175/371–373, 175/351, 352, 358, 361–364; 299/86; 308/8.2

[56] References Cited
UNITED STATES PATENTS

| 2,168,192 | 8/1939 | Carleton | 175/364 |
| 3,216,513 | 11/1965 | Robbins et al. | 175/372 X |
| 3,612,197 | 10/1971 | Motoyama | 175/372 X |
| 3,679,009 | 7/1972 | Goodfellow | 175/372 X |
| 3,752,243 | 8/1973 | Hummer et al. | 175/372 X |
| 3,756,332 | 9/1973 | Crane | 175/364 |
| 3,787,101 | 1/1974 | Sugden | 175/364 X |
| 3,791,705 | 2/1974 | Schimel | 175/363 X |

Primary Examiner—David H. Brown
Attorney, Agent, or Firm—Graybeal, Barnard, Uhlir & Hughes

[57] ABSTRACT

A plurality of rock cutter wheels are mounted for independent free rotation about a common support shaft. The support shaft is supported by a pair of end mounts which also carry seal rings presenting radial faces of hard material against the outer end surfaces of the cutter wheels adjacent the end mounts. A similar seal ring is provided between each adjacent pair of cutter wheels. Each such seal ring is carried by one of the cutter wheels and make sliding sealing contact with an end surface portion of the other.

13 Claims, 1 Drawing Figure

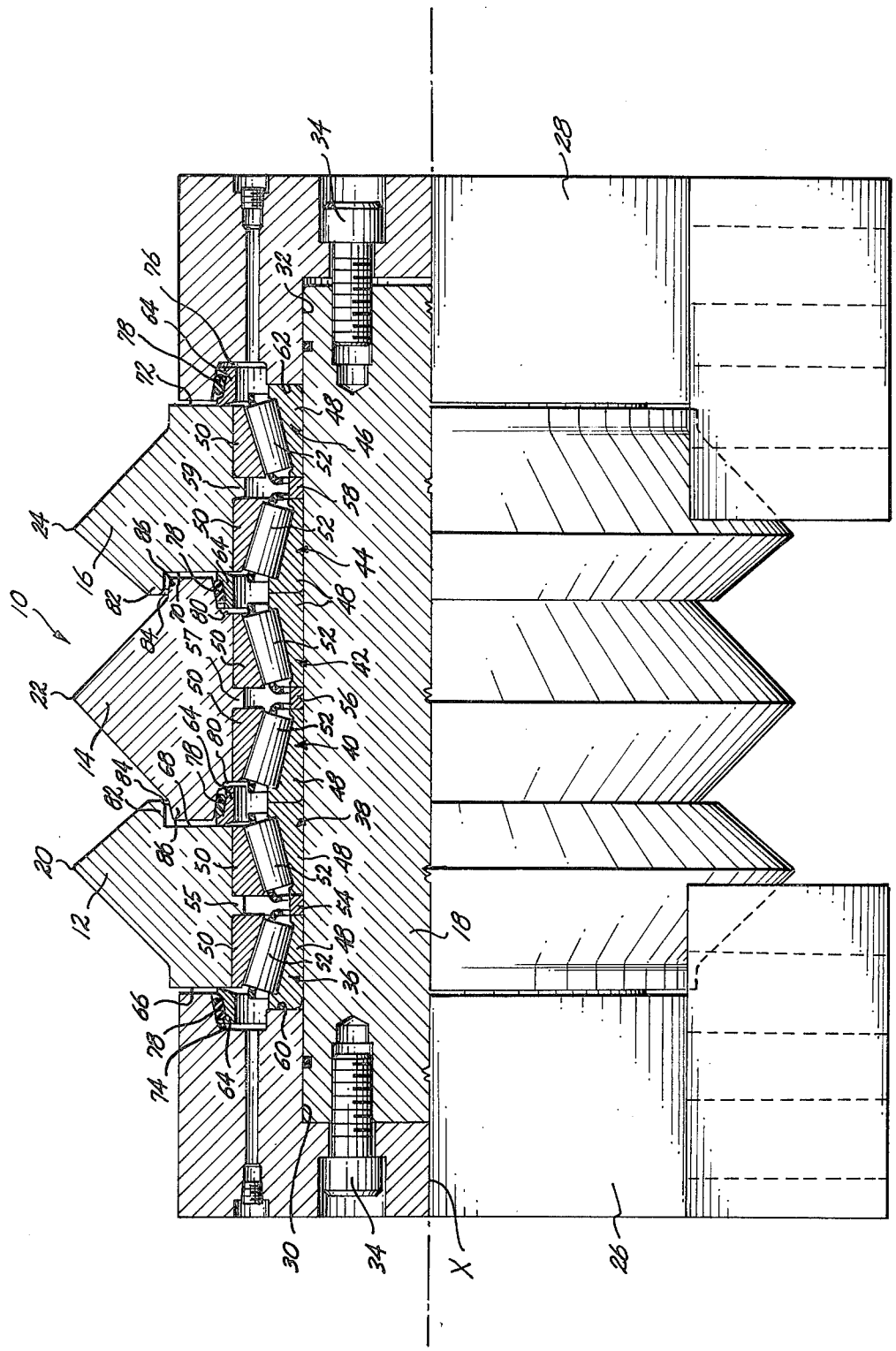

ROCK CUTTER ASSEMBLIES

BACKGROUND OF THE INVENTION

1. Field of the Invention

This invention relates to improvements in a rock boring machine, and in particular to rock cutter assemblies for rock boring machines.

2. Description of the Prior Art

Disc type rock cutters have circumferential cutting edges flanked by sloping rock breaker surfaces. A plurality of such disc cutters are mounted on a rotary cutter carrier at varying distances from the rotational center of the carrier, to cut concentric kerfs in the rock as the carrier is rotated. The breaker surfaces serve to fracture and dislodge the rock material between the kerfs.

It is customary to independently mount the cutter discs, and to angularly space apart a substantial distance the disc cutters which cut radially adjacent kerfs, so that their mounting structures will not interfere with each other. However, this is not possible at the center region of a cutter carrier because space does not permit it.

A center region disc cutter assembly has been proposed (U.S. Ser. No. 194,217, filed on Nov. 1, 1971) which utilizes a single support shaft supported to extend laterally across the rotation axis of the cutterhead. The shaft is made long enough to support a plurality of disc cutter wheels, each of which is bearing mounted for independent free rotation about the shaft. The bearing regions are protected by radial face seals provided at each end of each cutter wheel. Fixed seal mounts are provided outwardly of the end cutter wheels of the assembly and also between each adjacent pair of cutter wheels. In some installations this arrangement results in a greater than desired spacing between the cutter edges of the cutters, and hence between the concentric kerfs cut by such cutters.

U.S. Pat. No. 3,444,939, granted May 20, 1969, to Carl G. Bechem discloses disc cutter assemblies comprising a plurality of closely adjacent disc cutter wheels supported for independent free rotation. One of the disc cutter wheels includes an elongated, side extending sleeve mounting it for rotation about a central support shaft. The next disc cutter is mounted for rotation about such elongated sleeve. It includes its own elongated sleeve about which a third disc cutter is mounted for rotation.

U.S. Pat. No. 2,168,192, granted Aug. 1, 1939, to Michael D. Carleton, discloses a multiwheel cutter assembly having seal rings 25 of an unspecified type located between adjacent wheels.

U.S. Pat. No. 2,898,089, granted Aug. 4, 1959, to Otto Hammer, relates to a narrow hole disc bit having bearing faces of hard material between the discs where they contact each other.

SUMMARY OF THE INVENTION

According to the invention, a plurality (e.g. three) of disc cutter wheels are mounted quite close together for independent free rotation about a common central support shaft. The disc cutter wheels are supported for rotation by bearings. Radial face seals protect the bearing regions but fixed seal mounts are not provided between adjacent discs.

According to one aspect of the invention, the end mounts for the support shaft carry radial face seal rings which are fixed relative to such end mounts and which make sliding sealing contact with the outer end surfaces of the two end cutter wheels. The end portions of adjacent cutter wheels come close together. The regions between adjacent pairs of cutter wheels are each sealed by a seal ring which is carried by one of the cutter wheels and which makes sliding sealing contact with a radial surface portion of the other cutter wheel of the pair.

These and other features, advantages, and characteristics of the rock cutters assemblies of this invention will be apparatent from the following detailed description of a typical and therefore non-limitive embodiment of the invention, and from the accompanied drawing.

BRIEF DESCRIPTION OF THE DRAWING

The single drawing FIGURE shows an embodiment of the invention, partially in side elevation and partially in longitudinal section.

DESCRIPTION OF THE PREFERRED EMBODIMENT

Referring to the drawing, the cutter assembly 10 is shown to comprise three disc type roller cutters 12, 14, 16, supported on a single elongated support shaft 18 for independent free rotation thereabout. The longitudinal axis x of support shaft 18 is a radial line relative to the rotating cutterhead onto which the cutter assembly 10 is mounted. During cutterhead rotation the circumferential cutting edges 20, 22, 24 of the discs 12, 14, 16, respectively, travel separate circular paths which are concentric with each other and with circular paths traveled by the cutting edges of other disc cutters (not shown) which are mounted on the cutterhead. The rock breaker surfaces flanking each cutting edge 20, 22, 24 meet at the cutting edges and come close to meeting at the valley regions between cutter wheels.

The support shaft 18 is supported between a pair of spaced apart end standards 26, 28 which may be attached to the cutterhead in any suitable manner. By way of typical and therefore non-limitive example, the standards 26, 28 may be formed to include sockets 30, 32 for receiving the end opposite portions of the support shaft 18. The support shaft 18 may be secured against rotation by means of a plurality of cap screws 34 received in countersunk openings provided in the end standards 26, 28 and threading into threaded bores provided in the end portions of the support shaft 18.

According to the invention, a plurality of bearings 36, 38, 40, 42, 44, 46 are mounted on and about support shaft 18 and the disc cutters 12, 14, 16 are mounted on and about the bearings 36, 38, 40, 42, 44, 46. The bearings may be anti-friction type bearings comprising inner and outer races 48, 50 between which are located a plurality of roller elements 52, the axes of which are tilted so that the bearings can carry both axial and radial loads.

Disc cutter 12 is supported by bearings 36, 38, disc cutter 14 by bearings 40, 42, and disc cutter 16 by bearings 44, 46. A spacer ring 54 is provided between the inner races 48 of bearings 36, 38. A like spacer ring 56 is provided between the inner races 48 of bearings 40, 42. And, another such spacer ring 58 is provided between the inner races 48 of bearings 44, 46. The cutters 12, 14, 16 are formed to include spacer flanges 55, 57, 59 which separate the outer races 50 of such pairs of bearings. The spacer flanges 55, 57, 59 serve to divide the open center of the cutter wheels 12, 14, 16 into two oppositely opening bearing sockets. The inner races 48 of bearings 38, 40 are shown to be in contact with each other and the inner races 48 of bearings 42, 44 are shown in contact with each other. The inner races 48 of bearing 36, 46 are shown to make contact with radial surface portions 60, 62 of the end standards 26, 28, respectively.

According to the invention, in the tri-disc embodiment which is illustrated, the two end disc cutters 12, 16 have generally radial end surfaces against which the radial sealing faces of radial-face type sealing rings 64 make sliding sealing contact. On disc cutter 12 these radial end faces are designated 66, 68. On disc cutter 16 they are designated 70, 72.

An elastomeric ring 78 backs up each seal ring 64 and provides a static seal between it and its support structure. It also provides a yielding force tending to bias the seal ring into sealing contact with the side face 66, 68, 70, or 72 of its disc cutter 12, 16. The seal rings 64 which makes sliding contact with the cutter disc faces 66, 72 are housed within annular recesses 74, 76 formed in the end standards 26, 28 in surrounding relationship to the sockets 30, 32.

In the tri-disc embodiment the center disc 14 is provided with annular end recesses 80 near its center for receiving and housing the two inner seal rings 64 and their elastomeric backing rings 78. These two inner seal rings 64 are located axially between the bearings 38, 40 and the bearings 42, 44, and slightly radially outwardly of such bearings. The two inner seal rings 64 rotate with the center disc cutter 14. The inner ends of the two outer cutter discs 12, 16 are formed to include larger annular recesses which are sized to receive the end portions of the center disc cutter 14. Owing to this recessed arrangement, the outer two disc cutters 12, 16 include annular inner end (or shoulder) portions 82 which concentrically surround the opposite end portions of the center disc cutter 14.

The small dimension annular gaps 84 formed by and between the end portions 82 of cutter discs 12, 16 and the end portions 86 of cutter disc 14 provide effective barriers against movement of relatively large pieces of rock or earth material into the seal region. The seals 64 keep out the very fine abrasive particles. The shoulders 82 prevent seal damage or breakage by large rocks being pushed into the seals 64.

As will be apparent, the number of disc cutters in the cutter assembly can vary. For example, in a cutter assembly utilizing only two disc cutters, one of such disc cutters may be like disc cutter 12 and the other like disc cutter 14 except for it having a right end portion which is constructed like the right end portion of disc cutter 16. Disc cutter assemblies having more than three cutter discs may be made, with each avenue between adjacent cutter discs being provided with a seal ring arrangement patterned after the seal arrangement between cutters 12 and 14 or the seal arrangement between cutters 14 and 16.

From the foregoing, various further modifications, component arrangements and modes of utilization of the rock cutting equipment of this invention will be apparent to those skilled in the art to which the invention is addressed, within the scope of the following claims.

What is claimed is:

1. A rock cutter assembly comprising, first and second rock cutter wheels mounted axially adjacent each other for independent free rotation about a common axis, a hard material seal ring between said cutter wheels, means mounting said seal ring onto said first cutter wheel for rotation therewith and in sliding sealing contact with said second cutter wheel.

2. A rock cutter assembly according to claim 1, further comprising static seal means between said seal ring and said first cutter wheel.

3. A rock cutter assembly according to claim 1, wherein each said roller cutter is a disc type cutter, each having a circumferential cutting edge flanked by a pair of sloping rock breaker surfaces intersecting at the cutting edge.

4. A rock cutter assembly according to claim 1, wherein said first and second cutter wheels are annular, said first cutter wheel surrounds and is supported for rotation by a first bearing assembly, said second cutter wheel surrounds and is supported for rotation by a second bearing assembly, and said seal ring is located axially between said first and second bearing assemblies.

5. A rock cutter assembly according to claim 4, wherein said first cutter wheel includes an end recess in which said seal ring is housed.

6. A rock cutter assembly according to claim 5, wherein said second cutter wheel includes an end recess into which extend the recessed end portion of said first cutter wheel and the seal ring carried thereby.

7. A rock cutter assembly according to claim 6, wherein said second cutter wheel includes generally a radial seal surface forming the base of its recess and the seal ring makes sliding sealing contact with said surface.

8. A rock cutter assembly according to claim 6, wherein said first cutter wheel includes an annular end portion located radially outwardly of its said end recess in which the sealing ring is located, and said second cutter wheel includes an annular shoulder portion situated radially outwardly of the end recess in said second cutter wheel, said shoulder portion surrounding the annular end portion of the first cutter wheel, with a small dimension clearance existing between said annular shoulder and said annular end portion.

9. A rock cutter assembly according to claim 6, further comprising static seal means between said seal ring and said first cutter wheel.

10. A rock cutter assembly according to claim 9, wherein said static seal means is a ring of elastomeric material which is in compression when the seal ring is in sealing contact with the second cutter wheel.

11. A rock cutter assembly comprising a fixed support shaft, three sets of bearings arranged end-to-end on said shaft, and three roller cutter wheels mounted for independent free rotation on and by said bearings, with the center cutter wheel having recesses at each of its ends into which a hard material seal ring is received, and with each of the end cutter wheels having radial surface portions making sliding sealing contact with said seal rings.

12. A rock cutter assembly according to claim 11, comprising a pair of end mounts for said support shaft, and a hard material seal ring between each end mount and the outer end of the adjacent cutter wheel.

13. A rock cutter assembly according to claim 12, wherein the hard material seal rings which are between each end mount and the outer end of the adjacent cutter wheel are carried by said end mounts and make sliding sealing contact with generally radial end surfaces on the cutter wheels.

* * * * *